United States Patent [19]

Comte et al.

[11] Patent Number: 4,877,056

[45] Date of Patent: Oct. 31, 1989

[54] DIGITAL VALVE

[75] Inventors: Gilles Comte, Chelles; Andre Viode, Saint-Etienne, both of France

[73] Assignees: Societe Anonymes dite: SOGELERG, Rungis Cedex, France; Societe Nouvelle Auxim, Saint-Etienne, France

[21] Appl. No.: 330,577

[22] Filed: Mar. 30, 1989

[30] Foreign Application Priority Data

Mar. 31, 1988 [FR] France .................................. 88 04305

[51] Int. Cl.[4] .............................................. G05D 7/03
[52] U.S. Cl. ..................................... 137/599; 137/884
[58] Field of Search ................ 137/601, 599, 315, 884

[56] References Cited

U.S. PATENT DOCUMENTS

| | | |
|---|---|---|
| 3,670,768 | 6/1972 | Griswold . |
| 3,746,041 | 7/1973 | Friedland ............................ 137/599 |
| 3,937,248 | 2/1976 | Hutton . |
| 3,942,553 | 3/1976 | Gallatin . |
| 4,019,533 | 4/1977 | Jerde et al. . |
| 4,223,811 | 9/1980 | Czegledi .......................... 137/599 X |
| 4,708,158 | 11/1987 | Akamatsu ........................... 137/315 |

*Primary Examiner*—Stephen M. Hepperle
*Attorney, Agent, or Firm*—Sughrue, Mion, Zinn, Macpeak & Seas

[57] ABSTRACT

A "digital" valve comprises a plurality of shutters (46) connected in parallel between an inlet duct (2) and an outlet duct (42) of the digital valve, with each shutter (46) being constituted by an elementary spherical plug valve (50) capable of transmitting an individual flow rate. These shutters are distributed angularly around the axis of the digital valve and each of them is incorporated in a module (24) received in a standard seating (14, 18), thereby making it easy to remove any of the modules. The invention is particularly applicable to rapidly changing over between different flow rates of a liquid or a gas under the control of a digital electronic system (70).

8 Claims, 3 Drawing Sheets

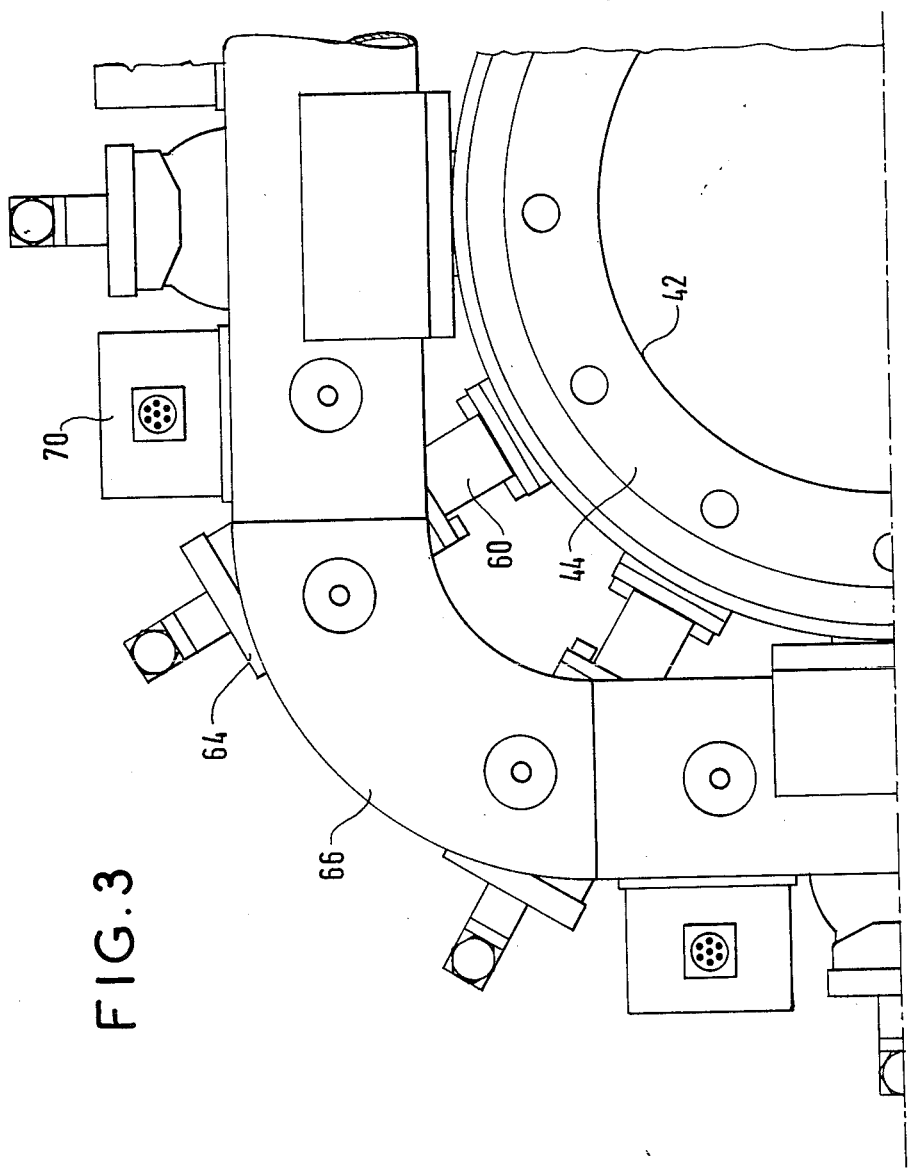

DIGITAL VALVE

The present invention relates to controlling the flow rate and/or the pressure of a gaseous or a liquid fluid. Digital valves are known which can be connected directly to an electronic control system which is purely digital for the purpose of providing such flow rate control.

BACKGROUND OF THE INVENTION

One prior art digital valve comprises the following elements which it shares in common, at least in part, with a valve in accordance with the invention:

a digital valve comprising:

an inlet duct disposed on a valve axis in order to receive a fluid at an upstream pressure via an upstream side, and an outlet duct disposed on the same axis in order to allow said fluid to leave via a downstream side under a downstream pressure which is substantially smaller;

a plurality of shutters, each serving, when open, to disengage an orifice allowing a flow of said fluid to pass from said inlet duct to said outlet duct at a rate which is individual to said shutter, and serving, when closed, to prevent said flow;

a valve body forming a plurality of seatings angularly distributed around said valve axis around a ring of shutters with the diameter of the ring being greater than the diameter of said inlet duct, at least, said seatings each receiving a corresponding one of said shutters in such a manner as to connect said shutters in parallel between said inlet duct and said outlet duct so that the flows through open shutters are added together; and a plurality of actuators each for actuating a corresponding one of said shutters.

In this prior art valve, shutters having different specific flow rates are fitted in identical seatings, thereby enabling a common valve body to be used for different sets of shutters, at least within limits. The shutters are angularly distributed around the axis of the valve since that makes it relatively simple firstly to receive the shutters and their actuators, and secondly to obtain independent access to each of the shutters for repair or replacement, if necessary. The coaxial disposition of the inlet and outlet ducts facilitates inserting the valve in a rectilinear line of pipework.

One such prior art digital valve is described, for example, in U.S. Pat. No. 3,937,248.

In general, the specific flow rates of the various shutters are distributed, with reference to a unit flow rate which is the smallest possible flow rate, over successive terms of a geometrical progression having a ratio of 2, i.e., for example, 1, 2, 4, 8, 16, 32, etc. By adding such terms together it is possible to obtain any integer number in the range 1 to a maximum number, e.g. 63, using a minimum number of terms. In other words, such a distribution of shutter flow rates has the advantage that every intermediate flow rate can be obtained to within one flow rate unit using a minimum number of shutters. However, other distributions are possible and may be more advantageous.

An essential quality of such valves may be called the exactness with which they add flow rates. When this quality is present, the flow rate of the valve is always equal to the sum of the individual flow rates of the open shutters regardless of which shutters are open and regardless of how many shutters are open, with the individual flow rate of each shutter being the rate that flows therethrough when it is the only one of the shutters to be open. This quality of exactness is lost when the flows passing through two open shutters interact with each other in such a manner as to cause the fluid pressure and/or speed to be modified in the vicinity of either shutter, in which case the flow rate through the shutter is different from its individual flow rate. This quality of exactness is easier to obtain if the pressure difference between the upstream and the downstream sides of the valve is increased, i.e. if the head loss through the valve is increased and/or if the size of the valve is increased relative to the flow rates to be controlled, i.e. if its bulk is increased.

Prior art digital valves suffer from drawbacks with respect to one or other of the following points:

valve manufacturing cost;

cost of adapting a valve to a different flow rate step size;

ease with which various shutter modules can be removed for repair or replacement;

bulk;

exactness of flow rate addition;

head loss;

speed of changeover between two successively controlled flow rate values; and transmitting large flow rates.

The object of the present invention is to remedy such drawbacks of prior art digital valves in simple manner.

More particularly, the present invention seeks to reconcile great ease in removing each of the shutter modules with a valve which is compact and which has accurate flow rate addition.

SUMMARY OF THE INVENTION

A valve according to the present invention includes the above-mentioned common elements, and compared with the above-mentioned prior art valve, it includes the following features:

each of said seatings in said valve body is in the form of a re-entrant dihedral angle open outwardly and in the upstream direction, one side of said angle being constituted by an inlet wall disposed on the radially inside side of the corresponding one of said shutters and extending along a circumferential direction and along a direction which is axial or outwardly oblique, and on the other side by an outlet wall disposed downstream from said shutter and extending along a circumferential direction and along a direction which is radial or oblique towards the downstream direction;

each of said shutters is incorporated in a corresponding shutter module having two bearing faces forming a projecting dihedral angle of the same value as said re-entrant dihedral angle;

module fixing means removably fix each of said shutter modules to bear via said bearing faces against said inlet and outlet walls of its seating;

said inlet and outlet walls of each of said seatings and said corresponding shutter module incorporating one of said shutters, form, for said fluid, when said shutter is open, a bent duct having an inlet branch substantially perpendicular to said inlet wall and an outlet branch substantially perpendicular to said outlet wall, enabling said fluid to penetrate into an outlet chamber which is common to at least a plurality of said seatings, and which communicates with said outlet duct or is constituted thereby; and sealing means are provided between said bearing faces of said module and said walls of its seating around said inlet and outlet branches.

The said dihedral angle may be truncated in the vicinity of its ridge. Its inlet side constituted by a face radially outside said inlet wall may, in section on an axial plane, be exactly axial or else inclined, possibly up to as much as 45°, sloping away from the axis in the upstream direction. Its outlet side constituted by an upstream face of said outlet wall may similarly be exactly radial or else it may slope inwardly going downstream, possibly by as much as 30° or even 45°.

This simple disposition makes it possible, after the fixing between a shutter module and the body of the valve has been undone, to withdraw the module in a radial direction and also in an axial direction upstream, albeit at an oblique angle, with few disassembly operations and without rubbing against the sealing rings which conventionally constitute the sealing means. It has also been found that this disposition makes it possible to conserve exactness of flow rate addition even if some of the flow rates are large relative to the size of the valve. As for the outlet chamber, the simplest solution is for it to be common to all of the sectors of the valve body.

In accordance with the invention, and where circumstances allow, the following preferred dispositions may also be adopted:

Said inlet walls of the seatings are formed at a radius greater than the radius of said inlet duct, and a divergent tube guides said fluid from said inlet duct to said inlet passages formed through said walls and forming portions of said inlet branches. A common inlet chamber is thus constituted in contact with said inlet walls and of sufficient size to prevent any detrimental interaction between the flows going towards the inlet passages which correspond to shutters that are open, and this applies even when the inlet duct itself is small in diameter. When the fluid going through the valve is gaseous, the sizes of the inlet chamber and of the inlet duct can be reduced with increasing pressure in the duct.

Outlet passages constituting portions of said outlet branches through said outlet walls are formed at a radius which is greater than the radius of said outlet duct, and a convergent tube guides the fluid leaving said outlet chamber progressively towards said outlet duct in such a manner as to prevent interaction occurring between the flows leaving a plurality of said outlet passages, since such interaction could have the effect of modifying the flow rates passing through said shutters. It has been observed that the risk of detrimental interaction between the flows passing through the various open shutters is greatest downstream from the outlet passages, which has the effects firstly of preventing the radius of the outlet chamber being as small as the radius of the inlet chamber, and secondly of requiring the outlet flows to be collected together with precaution. In particular, these flows must initially be parallel to one another, or nearly so.

A flow-regularizing grille is disposed in each of said outlet branches downstream from its said shutter.

Inside each of said shutter modules, said bent duct comprises a rectilinear inside segment of said inlet branch, a bend, and an inside rectilinear segment of said outlet branch. An advantage of this disposition is that module manufacture is facilitated when a relatively large fraction of the length of the bent duct is constituted by rectilinear segments.

Each of said shutters has an inlet-outlet axis disposed on one of said inside segments of the outlet branch, and includes an actuator shaft perpendicular to said inlet/-outlet axis, said actuators being disposed on said actuator shafts and being angularly distributed around a ring of actuators outside said ring of shutters. This disposition makes it possible to constitute the shutters by means of valves of conventional type which are simple to manufacture and calibrate, and it ensures that considerble space is available for their actuators.

Said shutters are plug valves rotating about said actuator shafts and driven by said actuators via said shafts. These valves are advantageously valves of conventional type having spherical plugs and they make it possible to give the highest flow rate shutter an individual flow rate which is large relative to the size of the digital valve.

Said actuators are pneumatic or hydraulic actuators powered from a common supply of compressed air or other fluid, and each provided with at least one electrically controlled valve enabling it to be controlled by an electronic digital control system. Such actuators enable relatively rapid changeover to be obtained at moderate cost. If the actuators are large in size, they are advantageously disposed in said ring of actuators in the above-mentioned preferred disposition. Naturally, respective electronic amplifiers may be provided between said electronic control system and each of said electrically controlled valves for controlling the hydraulic or pneumatic actuators.

However, it may sometimes be preferable to use electrical actuators directly, particularly with individual digital valves of small dimensions.

BRIEF DESCRIPTION OF THE DRAWINGS

An implementation of the invention in the context of the above description is described below in greater detail by way of non-limiting example and with reference to the accompanying diagrammatic figures. When the same item is shown in several of the figures, it is designated in all of them by the same reference symbol. The implementation given by way of example includes the dispositions mentioned above as being preferred in the present invention. It should be understood that the items mentioned may be replaced by other items performing the same technical functions.

FIG. 3 shows the downstream side of said digital valve.

DETAILED DESCRIPTION

Figure 1:
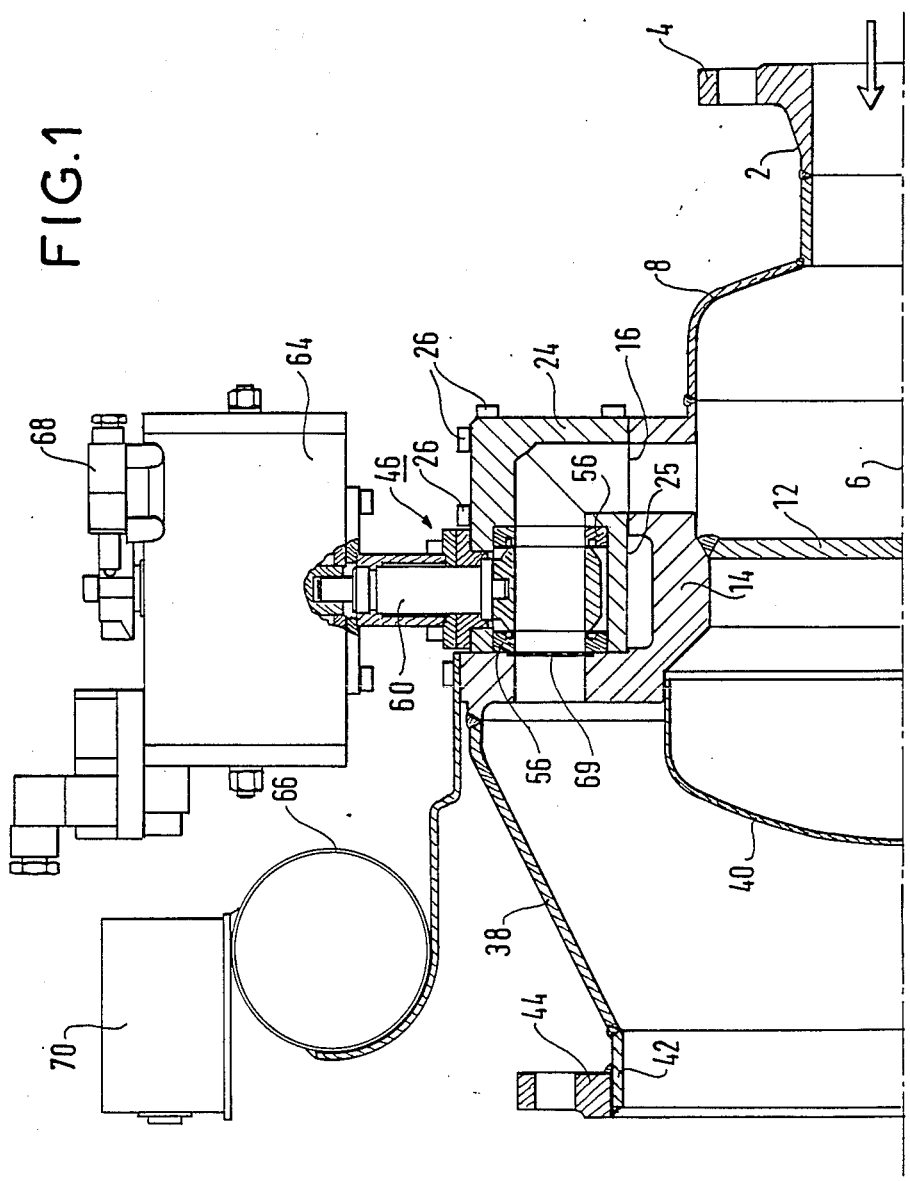
FIG. 1 is an axial section view through digital valve in accordance with the invention.
Figure 2:
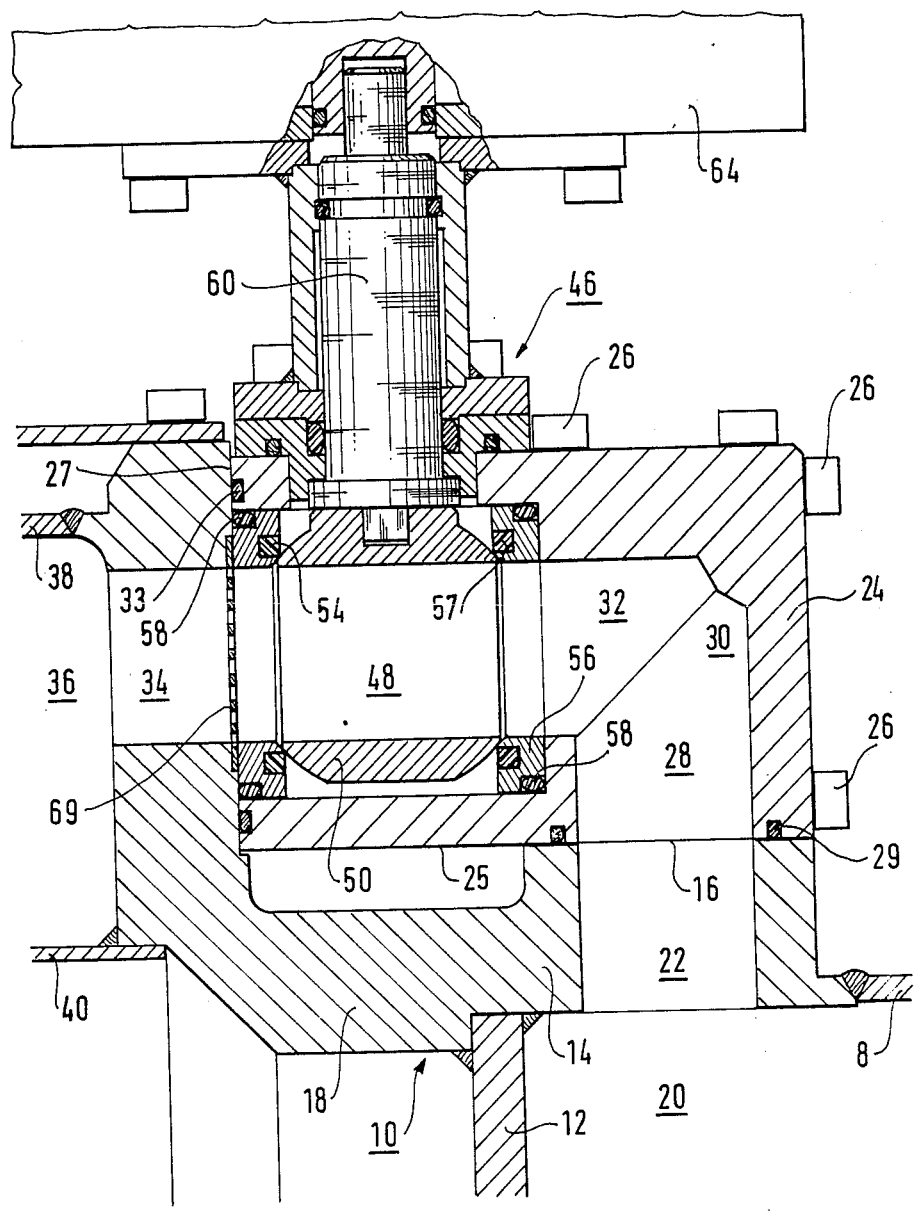
FIG. 2 is an enlargement of a portion of FIG. 2 representing a shutter.

The digital valve has an axis 6. Its said inlet duct 2 is provided with a coupling flange 4 and it is connected at its downstream end by being welded to a divergent tube 8 which is in turn welded to a valve body 10. The valve body is generally in the form of a circular ring whose central hole is closed by a partition 12. Successive angular sectors of said ring each include one of said outlet walls 18 and one of said inlet walls such as 14 having a plane outer face 16 constituting a flat. Each of these sectors thus forms a seating in the form of a dihedral angle, with the inlet side of said angle being substantially parallel to the axis of the valve and with the outlet side thereof being perpendicular to said axis. An inlet chamber 20 is formed inside the inlet wall 14 upstream from the partition 12. An approximately cube-shaped shutter module 24 is fixed by means of screws such as 26 to bear against said inlet and outlet walls in the seating formed therebetween. Its said bearing faces are shown at 25 and 27. The inlet wall 14 is pierced by one of said radial inlet passages which is extended inside the module 24 by means of a duct segment 28. The fluid duct then has a 90° bend 30 followed by another duct segment 32 inside the module 24, followed by an axial outlet passage 34 passing through the outlet wall 18. Sealing O-rings 29 and 33 surround the segments 28 and 32 at the interfaces between the module 24 and the walls 14 and 18. All of the outlet passages such as 34 open out into a common annular outlet chamber 36 externally delimited by a converging tube 38 and internally delimited by a projection 40. The converging tube 38 connects this chamber to an outlet duct 42 provided with a coupling flange 44.

The module 24 includes a shutter 46 having an orifice 48 disposed on the inside outlet segment 32 and passing through a spherical plug 50. Various different shutters, e.g. four, have same-diameter spherical plugs with different diameter orifices drilled through them depending on the nominal flow rates through the shutters, with the maximum diameter of said orifices being the same as the diameter of the outlet branch 32, 34. A digital valve comprising twelve shutters would then have three different diameters of spherical plug. Sealing rings are provided at 52 and 54 between the plug 50 and the body 56 of the plug valve, at 56 between said body and the module 24, and at 58 between said body and the wall 18. A grille 69 makes the flow downstream from the plug 50 more regular.

The plug is rotated by a control shaft 60 connecting the plug to a pneumatic actuator 64 driven by compressed air from a manifold 66 via an electrically controlled valve 68. The manifold is in the form of a tube going all the way round the digital valve close to its actuators such as 64. It is of sufficiently large diameter to constitute a buffer supply of compressed air. It is fed in turn from a compressor (not shown). A plurality of electrically controlled valves such as 68 are controlled by a common electronic system 70. Said rings of shutters and actuators are constituted by shutters such as 46 and actuators such as 64 angularly distributed around the axis 6.

We claim:

1. A digital valve comprising:
   an inlet duct disposed on a valve axis in order to receive a fluid at an upstream pressure via an upstream side, and an outlet duct disposed on the same axis in order to allow said fluid to leave via a downstream side under a downstream pressure which is substantially smaller;
   a plurality of shutters, each serving, when open, to disengage an orifice allowing a flow of said fluid to pass from said inlet duct to said outlet duct at a rate which is individual to said shutter, and serving, when closed, to prevent said flow;
   a valve body forming a plurality of seatings angularly distributed around said valve axis around a ring of shutters, with the diameter of the ring being greater than the diameter of said inlet duct, at least, said seatings each receiving a corresponding one of said shutters in such a manner as to connect said shutters in parallel between said inlet duct and said outlet duct so that the flows through open shutters are added together; and
   a plurality of actuators each for actuating a corresponding one of said shutters;
   wherein:
   each of said seatings in said valve body is in the form of a re-entrant dihedral angle open outwardly and in the upstream direction, one side of said angle being constituted by an inlet wall disposed on the radially inside side of the corresponding one of said shutters and extending along a circumferential direction and along a direction which is axial or outwardly oblique, and on the other side by an outlet wall disposed downstream from said shutter and extending along a circumferential direction and along a direction which is radial or oblique towards the downstream direction;
   each of said shutters is incorporated in a corresponding shutter module having two bearing faces forming a projecting dihedral angle of the same value as said re-entrant dihedral angle;
   module fixing means removably fix each of said shutter modules to bear via said bearing faces against said inlet and outlet walls of its seating;
   said inlet and outlet walls of each of said seatings and said corresponding shutter module incorporating one of said shutters, form, for said fluid, when said shutter is open, a bent duct having an inlet branch substantially perpendicular to said inlet wall and an outlet branch substantially perpendicular to said outlet wall, enabling said fluid to penetrate into an outlet chamber which is common to at least a plurality of said seatings, and which communicates with said outlet duct or is constituted thereby; and
   sealing means are provided between said bearing faces of said module and said walls of its seating around said inlet and outlet branches.

2. A valve according to claim 1, wherein said inlet walls of the seatings are formed at a radius greater than the radius of said inlet duct, and a divergent tube guides said fluid from said inlet duct to said inlet passages formed through said walls and forming portions of said inlet branches.

3. A valve according to claim 1, wherein outlet passages constituting portions of said outlet branches through said outlet walls are formed at a radius which is greater than the radius of said outlet duct, and a convergent tube guides the fluid leaving said outlet chamber progressively towards said outlet duct in such a manner as to prevent interaction occurring between the flows leaving a plurality of said outlet passages, since such interaction could have the effect of modifying the flow rates passing through said shutters.

4. A valve according to claim 1, wherein a flow-regularizing grille is disposed in each of said outlet branches downstream from its said shutter.

5. A valve according to claim 1, wherein inside each of said shutter modules, said bent duct comprises a rectilinear inside segment of said inlet branch, a bend, and an inside rectilinear segment of said outlet branch.

6. A valve according to claim 5, wherein each of said shutters has an inlet-outlet axis disposed on one of said inside segments of the outlet branch, and includes an actuator shaft perpendicular to said inlet/outlet axis, said actuators being disposed on said actuator shafts and being angularly distributed around a ring of actuators outside said ring of shutters.

7. A valve according to claim 6, wherein said shutters are plug valves rotating about said actuator shafts and driven by said actuators via said shafts.

8. A valve according to claim 6, wherein said actuators are pneumatic or hydraulic actuators powered from a common supply of compressed air or other fluid, and each provided with at least one electrically controlled valve enabling it to be controlled by an electronic digital control system.

* * * * *